United States Patent Office 3,763,280
Patented Oct. 2, 1973

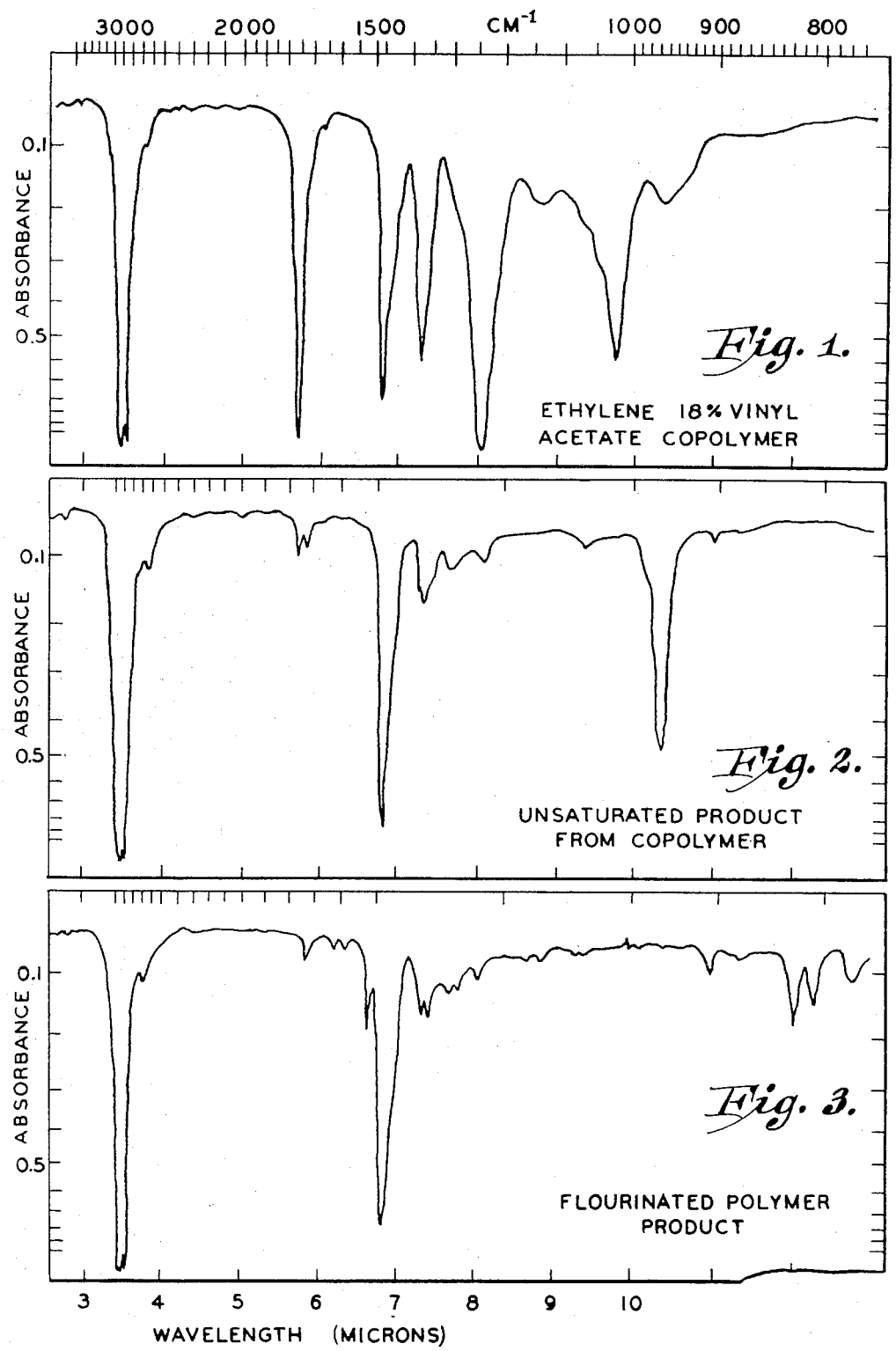

3,763,280
METHOD OF MANUFACTURING A FLUORINATED POLYMER AND BLENDS OF SAID FLUORINATED POLYMER WITH POLYETHYLENE
Ronald E. Gilbert, Shawnee Mission, Kans., assignor to Gulf Research & Development Company, Pittsburgh, Pa.
Original application Aug. 17, 1970, Ser. No. 64,512, now Patent No. 3,709,855. Divided and this application May 9, 1972, Ser. No. 251,715
Int. Cl. C08f 29/22
U.S. Cl. 260—897 C  2 Claims

ABSTRACT OF THE DISCLOSURE

Unsaturated polymers made by thermal deacetoxylation of ethylene-vinyl acetate copolymers are fluorinated under mild conditions, as by in situ-generated lead tetrafluoride, to yield readily processable thermoplastic fluorohydrocarbon polymers which can be blended with polyethylene.

---

This is a division of application Ser. No. 64,512 filed Aug. 17, 1970, now U.S. Pat. 3,709,855.

DESCRIPTION OF THE INVENTION

Copolymers and terpolymers of ethylene with difluoroethylene or tetrafluoroethylene are not readily prepared because of incompatibility of the monomers. Homopolymers of tetrafluoroethylene are well known, but these polymers are notoriously difficult to process. Frequently the techniques of the powder metallurgy art are resorted to in order to form these materials into desired shapes.

I have discovered a method of manufacturing heat processable fluorohydrocarbon polymers which have chemical structures of the type which one would reasonably expect to find in the hitherto non-existent ethylene-fluoroethylene copolymers.

Briefly, in the method of this invention there is used as starting material a hydrocarbon polymer containing trans olefinic unsaturation which may be made by heating an ethylene-vinyl acetate copolymer containing from 5 to 25 weight percent vinyl acetate until the copolymer is substantially free of acetoxy substituents and contains a number of olefinic double bonds substantially equivalent to the number of acetoxy groups which have been removed by heating. According to the present invention the resulting unsaturated polymer is reacted in a non-reactive solvent with a fluorinating reagent comprising lead dioxide and hydrogen fluoride under controlled conditions until the polymer is substantially free of olefinic double bonds and contains a substantial amount of chemically bound fluorine, and the resulting thermoplastic fluorohydrocarbon polymer is then recovered from the reaction mixture.

Presented below are illustrative procedures for accomplishing the steps outlined above, the changes in chemical nature of the polymer after each step being evidenced by changes in the infrared absorption spectra as illustrated in FIGS. 1, 2 and 3.

Manufacturing the unsaturated hydrocarbon polymer

A commercial copolymer of ethylene with 11.2 weight percent vinyl acetate was charged to a vented twin screw extruder where is was subjected to thermal de-acetoxylation. Six heated zones were at the following temperatures in succession; 125° C., 305° C., 390° C., 390° C., 390° C. and 350° C. The extruder screws were operated at 107 r.p.m. A slow stream of nitrogen purge gas was swept through the apparatus as an aid in removal of acetic acid through the vent. At the feed throat of the extruder a substantial stream of nitrogen purge gas prevented discoloration of the polymer during thermal treatment. For 934 grams of polymer charged, 65.0 grams of volatile condensate was recovered from the vents. Total recovery of vented volatiles was about 88 percent. Infrared absorption analysis of the thermally converted polymer indicated that it still contained 0.8 weight percent vinyl acetate. This polymer was judged to be substantially free of acetoxy groups, sufficient for the purpose of fluorination in the process of this invention and had an infrared absorption spectrum with bonds located similarly to the spectrum illustrated in FIG. 2.

Properties of the starting copolymer and the thermally converted material are compared below.

|  | Starting copolymer | Product |
|---|---|---|
| Melt index | 18.6 | 52.9 |
| Solution viscosity | 0.6 | 0.6 |
| Melting point peak, ° C | 89 | 99 |
| Percent crystallinity | 30.7 | 50.6 |

Fluorination of the unsaturated polymer

Into a stainless steel reactor there was charged 2.0 parts by weight of a thermally converted polymer having an infrared absorption spectrum similar to FIG. 2, as disclosed above, 0.2 part lead dioxide, 100 parts Tetralin and 1.0 part liquid hydrogen fluoride. The reactor was closed, brought up to a temperature of about 200° C. during about eight minutes and held between 200° C. and 204° C. for two hours.

Recovering the fluorinated polymer

The reactor was cooled and excess hydrogen fluoride was removed by venting into a safety trap. The product mixture was a fluid of dark gray-green color. The solid polymer was precipitated by addition of acetone, recovered by fitration and dried. The product, a slightly brownish colored thermoplastic solid, was found to contain 0.66 weight percent of chemically bound fluorine.

A sample of the polymer was pressed into a film between hot platens. The infrared absorption spectrum of the film was similar to that illustrated in FIG. 3.

DISCUSSION

FIGS. 1, 2 and 3 illustrate the changes in infrared absorption spectra which occur in the course of the process, beginning with a commercial copolymer of ethylene with 18 weight percent vinyl acetate. The characteristic changes in infrared absorption spectra may be observed and measured in monitoring the process and evaluating the effectiveness of the thermal conversion and fluorination steps.

Suitable copolymer starting materials are available as articles of commerce or may be manufactured by known methods. Copolymerization of ethylene with vinyl acetate is customarily accomplished by means of a free radical initiated, moderate pressure process.

Preferably the starting copolymer is one which contains at least 5 and less than 25 weight percent vinyl acetate. The polymers containing higher proportions of vinyl acetate are gummy and less convenient to work with and the final products are often cross-linked.

Thermal conversion of the vinyl acetate copolymer is conveniently accomplished in an apparatus in which the temperature and time can be accurately controlled and the product can be removed with a minimum of labor and expense. A screw extruder is particularly suitable for this purpose, but a batch reactor fitted with an apparatus for discharging the product may also be used.

The addition of fluorine to double bonds in the unsaturated polymer is a strongly exothermic reaction which is difficult to control. For this reason, it is preferred to use a rather mild fluorinating agent. A convenient reagent system for this purpose is the combination of lead dioxide and hydrogen fluoride, used according to the method of Henne and Waalkes, J. Am. Chem. Soc. 67, 1639–40 (1945). Other known fluorination procedures may be used, taking care to avoid overheating, which will result in degradation of the polymer.

The fluorohydrocarbon polymer products possess an interesting combination of properties. Of particular interest are the barrier properties and anti-friction and anti-blocking characteristics of films and coatings of the polymers. The polymers are found to be suited for use in the form of self-supporting films and coated web wrapping materials and in sizing compositions for fibrous webs to confer repellency to both water and oil. In a specific instance, the fluorocarbon polymer obtained as described above is dissolved in perchloroethylene and the solution is used to coat cloth, wood veneer paneling and thin sheet steel. The solvent is evaporated to leave thin coatings which impart soil resistance to cloth and wood and a weather resistant finish on the sheet steel.

In another specific application the fluorohydrocarbon polymer is dissolved in a solvent mixture, including a high vapor pressure chlorofluoroethane propellant and is packaged in a pressurized spray can. The resulting packaged product is useful for spray-coating sliding surfaces to reduce friction and formation of protective coatings on various substrates, as disclosed above.

In a further application a minor proportion of the fluorohydrocarbon polymer is melt-blended with polyethylene and the resulting molten mixture is formed into molded and extruded shapes which have improved resistance to weather,, staining and stress cracking.

I claim:

1. A molten mixture of polyethylene and a minor proportion of a thermoplastic fluorohydrocarbon polymer prepared by reacting a fluorinating agent comprising lead oxide and hydrogen fluoride with a hydrocarbon polymer containing trans olefinic unsaturation made by heating a copolymer of ethylene with from 5 to 25 weight percent vinyl acetate until the copolymer is substantially free of acetoxy substituents and contains a number of olefinic double bonds substantially equivalent to the number of acetoxy groups which have been removed by heating, said reaction being conducted in a non-reactive solvent under controlled conditions, yielding a reaction mixture containing a polymer which is substantially free of olefinic double bonds and contains a substantial amount of chemically bound fluorine, and recovering the resulting thermoplastic fluoro-hydrocarbon polymer from the reaction mixture.

2. A molded article made from the molten mixture of claim 1.

References Cited
UNITED STATES PATENTS 3,520,955    7/1970    Gilbert et al. _____ 260—897
3,190,941    6/1965    Balcar et al. _____ 260—772

MURRAY TILLMAN, Primary Examiner

C. J. SECCURO, Assistant Examiner

U.S. Cl. X.R.

117—132 CF, 140 A, 148; 260—33.6 PQ, 33.8 F, 87.3, 87.5, 94.7 HA, DIG 43